No. 632,123. Patented Aug. 29, 1899.
J. D. KAUFMAN, C. B. TITUS & A. E. VANARSDALE.
ACETYLENE GAS MACHINE.
(Application filed Mar. 30, 1899.)
(No Model.)

WITNESSES:
Edward Thorpe
C. R. Ferguson

INVENTORS
Jacob D. Kaufman
Charley B. Titus
Adnah E. Vanarsdale
BY
ATTORNEYS.

THE NORRIS PETERS CO., PHOTO-LITHO., WASHINGTON, D. C.

United States Patent Office.

JACOB D. KAUFMAN, CHARLEY B. TITUS, AND ADNAH E. VANARSDALE, OF LITTLE RIVER, KANSAS.

ACETYLENE-GAS MACHINE.

SPECIFICATION forming part of Letters Patent No. 632,123, dated August 29, 1899.

Application filed March 30, 1899. Serial No. 711,122. (No model.)

*To all whom it may concern:*

Be it known that we, JACOB D. KAUFMAN, CHARLEY B. TITUS, and ADNAH E. VANARSDALE, of Little River, in the county of Rice and State of Kansas, have invented a new and Improved Gas-Machine, of which the following is a full, clear, and exact description.

This invention relates to improvements in acetylene-gas machines; and the object of the invention is to provide a machine of this type, of simple and comparatively inexpensive construction, having a large carbid capacity and so arranged that the generator is completely surrounded by water, thus keeping the gas at all times at a low temperature.

We will describe a gas-machine embodying our invention and then point out the novel features in the appended claims.

Reference is to be had to the accompanying drawings, forming a part of this specification, in which similar characters of reference indicate corresponding parts in both figures.

Figure 1:
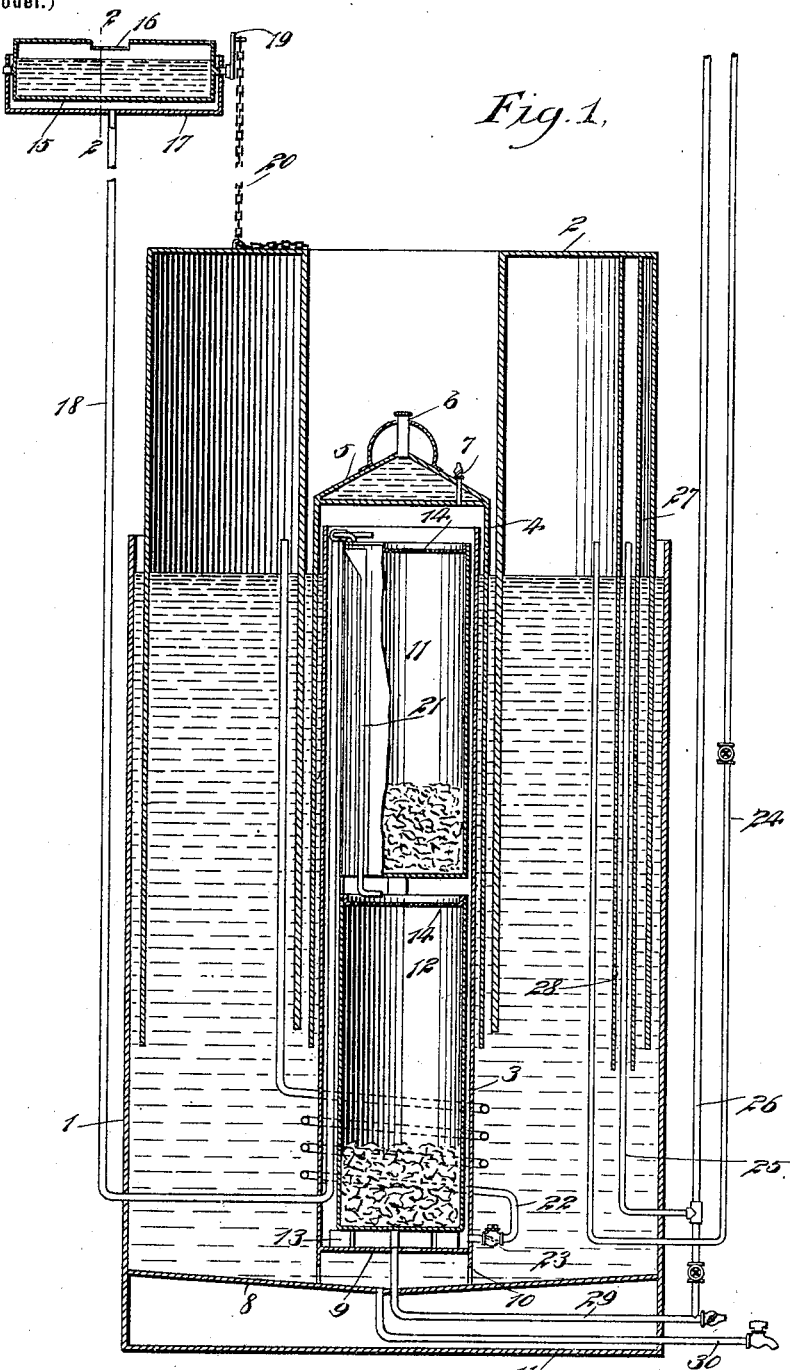
Figure 2:
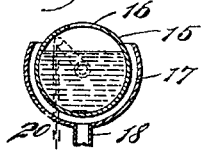

Figure 1 is a vertical section of a gas-machine embodying our invention, and Fig. 2 is a section on the line 2 2 of Fig. 1.

In this invention the generator is arranged wholly within the gasometer. Therefore the entire machine will occupy but a comparatively small space.

In the drawings, 1 designates the fixed portion of the gasometer, designed to contain water, and in this fixed portion is the movable bell 2. This bell is made substantially in the form of a drum, having a cylindrical opening at its center in which the generator is arranged.

The generator consists of a cylinder 3, having a cover 4, which surrounds the cylinder and extends down into the water in the gasometer. The cover 4 is provided with a water-chamber 5 at its top, and water may be poured into said chamber through a pipe 6, which communicates with the chamber. A valved tube 7 extends to the top of the cover and through the bottom of the chamber 5, and this pipe is designed when the valve is open to admit air to the generator when it is desired to remove the cover. The portion 3 of the generator rests upon the bottom 8 of the gasometer; but the bottom 9 of said generator is somewhat above the bottom 8, so that water may pass underneath the generator, this water passing through openings 10.

Removably arranged in the generator are two carbid-holders 11 12, one being placed above the other. The holder 12 is here shown as resting upon a crowfoot or spider 13, resting on the bottom 9 of the generator, and the holder 11 is supported on the holder 12 in any desired manner. Each holder has a removable perforated top or cover 14, which will cause the water to discharge in spray form upon the carbid in the holders. Water is automatically supplied to the carbid-holders from a tilting tank 15, which tank is made in cylindrical form and has an opening 16 in its top, through which the water will discharge when said tank is inverted, as will be hereinafter described. The tank has its journal-bearings in a trough 17, from which a supply-pipe 18 leads downward and through the portion 1 of the gasometer, thence into the generator, and up at the top or upper end of the upper carbid-holder 11, and it has at its upper end a movable spout to discharge water upon the perforated cover 14 of said upper carbid-holder.

To the shaft of the water-tank 15 is connected a crank 19, and this crank 19 has a connection 20 with the bell 2. Therefore when said bell descends by the discharge of gas therefrom the tank 15 will be rocked, so as to empty a portion of the water contained therein into the pipe 18, which, it may be here stated, is at all times full of water. Immediately the gas begins to generate the bell 2 will of course be raised, allowing the tank 15 to move back to its normal position. A pipe 21 leads downward from the upper portion of the upper carbid-holder 11 and is adapted to receive water from a movable spout on the pipe 18 to discharge upon the perforated cover 14 of the carbid-holder 12.

The generated gas will pass from the carbid-holders into the generator 3 and will pass into the bell of the gasometer through a pipe 22, leading from the lower portion of the generator and extended upward in the gasometer and having its outlet end above the plane of the water contained in the gasometer. This pipe is here shown as coiled around the lower portion of the generator, and it is provided with a check-valve 23, which will allow the desired passage of gas from the generator, but will prevent a backflow of gas therein.

A valved gas-distributing pipe 24 leads through the gasometer and extends upward therein to a point above the level of the water, and a blow-off pipe 25 leads from the gasometer at a point above its water-level and connects with a valved pipe 26.

Connected to the bell 2 and surrounding the pipe 25 is a pipe 27, which has near its lower end a hole 28, through which gas may pass when the bell is sufficiently elevated to bring said hole 28 above the level of the water. A valved pipe 29 leads from the bottom of the generator 3 and connects with the pipe 26. This pipe 29 is designed to draw off any water of condensation or sediment that might accumulate in the generator, and the water and sediment may be drawn from the gasometer through a valved pipe 30, leading from the bottom of said gasometer.

In operation, to start the generation of gas the tank 15 may be tilted, so as to add to the supply of water contained in the pipe 18, causing a portion of said water to flow from the pipe upon the perforated cover 14 of the upper carbid-holder. The water thus discharged will fall upon the carbid in the form of a spray, and the gas will immediately begin to generate, and of course the bell 2 will rise. When the pressure lessens or an excessive amount of gas is carried off through the distributing-pipe, the bell of the gasometer will lower and cause the tank 15 to tilt to discharge water, as before described, and this fresh supply of water discharged on the carbid will cause the further generation of gas.

Having thus fully described our invention, we claim as new and desire to secure by Letters Patent—

1. A gas-machine, comprising a gasometer having a cylindrical bell, a generator placed in the gasometer and extended into an opening formed vertically through the bell, a removable carbid-holder in the generator, a cover for the generator having a water-chamber in its upper portion, and means for supplying water to carbid in the holder, substantially as specified.

2. A gas-machine, comprising a gasometer having a cylindrical bell provided with a central vertical opening, a generator arranged in the gasometer and extending into the opening in the bell, a water-sealed cover for the generator, the said cover having a water-chamber in its upper portion, a removable carbid-holder, and means for supplying water to the carbid contained in the holder, substantially as specified.

3. A gas-machine, comprising a gasometer having a cylindrical bell provided with a vertical central opening, a generator in the gasometer and passing into the opening in the bell, the said generator being supported above the bottom of the gasometer so that water may pass underneath the generator, a water-sealed cover for the generator and having a water-chamber in its upper portion, a plurality of carbid-holders removably placed in the generator, a pipe leading from an upper holder to discharge water into a lower holder, a water-supply tank, and a pipe leading from said tank to discharge water into the upper carbid-holder, substantially as specified.

4. A gas-machine, comprising a gasometer, a generator arranged in the gasometer, carbid-holders removably placed in the generator one above the other each carbid-holder having a perforated top, a pipe secured to the upper carbid-holder for directing water to the lower carbid-holder, and means for supplying water to the upper carbid-holder and also to the pipe leading to the lower carbid-holder, substantially as specified.

5. A gas-machine, comprising a gasometer, a generator arranged therein, and carbid-holders removably placed in the generator, each of said carbid-holders having a perforated top or cover, means for supplying water to the carbid in the holders, a gas-pipe leading from the lower portion of the generator and upward in the gasometer, the said pipe having a portion coiled around the generator, a distributing-pipe leading from the gasometer, a blow-off pipe leading from the gasometer, a pipe leading from the bottom of the gasometer, and a valved pipe leading from the bottom of the generator, substantially as specified.

JACOB D. KAUFMAN.
CHARLEY B. TITUS.
ADNAH E. VANARSDALE.

Witnesses:
JAMES F. KENDRICK, Jr.,
MARION ALTON.